UNITED STATES PATENT OFFICE.

ADDISON F. HOFFMAN AND WILLIAM M. PARKIN, OF PITTSBURGH, PENNSYLVANIA.

PROCESS OF PICKLING METAL ARTICLES.

1,221,735. Specification of Letters Patent. Patented Apr. 3, 1917.

No Drawing. Application filed December 5, 1916. Serial No. 135,260.

*To all whom it may concern:*

Be it known that we, ADDISON F. HOFFMAN and WILLIAM M. PARKIN, citizens of the United States, residing at Pittsburgh, in the county of Allegheny and State of Pennsylvania, have invented new and useful Improvements in Processes of Pickling Metal Articles, of which the following is a specification.

The present invention relates to pickling metal articles, for example iron, steel and the like, either castings, wrought metal or any other variety of metal, and has particular reference to the preparation of iron and steel for coating with tin, zinc, enamel or the like.

It has been the custom, for many years prior to our invention to pickle iron and steel in a bath of dilute sulfuric or hydrochloric acids, or acid salts. In this pickling operation, there is a considerable amount of spray formed, perhaps by the escape of small bubbles of hydrogen from the surface of the pickling bath, aided by the heating of the bath, and this spray has been found to not only waste the acid, but also to be injurious to the floors or walls of the building, the workmen and metal stock with which it may come into contact.

It has been found that by the use of a material capable of producing a heavy blanket of foam upon the surface of the pickle liquor, the formation of spray or mist is avoided. A material suitable in many respects for the production of such a foam is sulfite waste liquor, produced by boiling wood in a solution of calcium bisulfite in the manufacture of wood pulp according to the so-called "sulfite process." The liquor as it comes from the digester, after the separation of the wood pulp, is found to contain, however, materials which act deleteriously, by the production of a coating of the surface of the metal articles, which coating prevents the ready adhesion of tin or zinc to the iron. We have found that this objection can be overcome by any treatment of the waste sulfite liquor which is capable of removing at least the major portion of sulfurous acid, under which term we include not only free sulfurous acid, but that which is in the form of sulfite or bisulfite.

In carrying out our process in the preferred manner we add to the waste sulfite liquor, after separation from the pulp, an amount of lime equivalent to the acidity of the liquor, and we then boil the mixture. This causes the precipitation of the free and combined sulfurous acid, in the form of neutral sulfites which can be separated from the liquor by filtration, producing a by-product suitable for use in preparing new sulfite liquor. This treatment also removes, under some conditions, a considerable amount of the calcium sulfate (this material ordinarily being present in small quantities in waste sulfite liquor, probably derived by oxidation). The lime does not remove the sulfonic acid compounds, lignone derivatives, gums, sugars and the like, which are the active materials in the production of the foam blanket.

While it appears that the materials actually producing the disadvantage of preventing tin or zinc very readily adhering to the iron may not necessarily be sulfites, the treatment above described for the removal of sulfites has been found to remove the disadvantage in question. It appears as possible that this disadvantage may be due to the presence of some other compounds which are removed by the lime treatment.

The liquor, after treatment with lime, and preferably after boiling, can be separated from the insoluble matter for example by filtration. The liquor can then be concentrated if desired, either to a thick syrup like molasses, or to a pasty condition, or even to dryness.

In the pickle bath we preferably add an amount of the liquor, in any one of the three forms above mentioned, containing about three to ten grains of solid matter, per gallon of pickle liquor. After the pickle liquor has been in use for some time, it is preferable to add, from time to time, further small quantities of the purified waste sulfite liquor.

While the purified waste sulfite liquor contains calcium, this is in the form of complex organic bodies, which do not to any material extent, lead to the production of calcium sulfate, by adding said liquor to the pickle liquor, when the latter contains sulfuric acid. The presence of calcium sulfate in the pickle liquor, in any material amounts, we have found to be objectionable, hence we prefer not to employ crude waste sulfite liquor.

While sulfite waste liquor from the treatment of various kinds of wood in the production of pulp, has been found to be suitable for our process, we find that the waste liquor obtained by treating soft pine wood particularly, or soft woods of the pine family, is especially suitable, this liquor containing certain oily materials not found in the treatment of other varieties of woods.

The sulfurous acid or other objectionable material in the raw waste sulfite liquor was found to produce a black scum or coating on the surface of the metal, of which the exact chemical composition is not thoroughly understood, but which was found to interfere materially with tinning or galvanizing. After treatment of the waste liquor with lime, boiling and filtration, this liquor does not then produce such scum or coating.

We claim:

1. In the pickling of metals, the step of subjecting such articles to the action of a bath containing a scale-removing agent and a small quantity of neutralized sulfite waste liquor.

2. The process which comprises neutralizing sulfite waste liquor with basic calcium compounds, removing insoluble matters, and thereafter adding a relatively small quantity of the same to an acid pickle.

3. A pickle containing acid and sulfite-free waste sulfite liquor ingredients.

4. A process which comprises subjecting waste sulfite liquor to a treatment capable of freeing the same from materials which would upon treatment with acids, liberate sulfurous acid, and thereafter adding a relatively small amount of such treated waste sulfite liquor to an acid pickling bath.

In testimony whereof we affix our signatures.

ADDISON F. HOFFMAN.
WILLIAM M. PARKIN.